United States Patent
Kucsma et al.

[15] 3,660,149
[45] May 2, 1972

[54] COATED FOAMED ALUMINUM BODY

[72] Inventors: Michael E. Kucsma; Wallace W. Parker, both of Baton Rouge, La.

[73] Assignee: Ethyl Corporation, New York, N.Y.

[22] Filed: Oct. 24, 1969

[21] Appl. No.: 869,344

[52] U.S. Cl. ..................117/132 C, 117/93.4, 75/20 F, 260/899
[51] Int. Cl. ......................B32b 5/18, B32b 15/08
[58] Field of Search............117/93.4, 17, 132 C; 260/899; 75/20 F, 68

[56] References Cited

UNITED STATES PATENTS

| | | | |
|---|---|---|---|
| 2,983,597 | 5/1961 | Elliott | 75/20 F |
| 3,399,075 | 8/1968 | Spiller | 117/93.4 |
| 3,502,492 | 3/1970 | Spiller | 117/17 |

*Primary Examiner*—Alfred L. Leavitt
*Assistant Examiner*—J. H. Newsome
*Attorney*—Donald L. Johnson

[57] ABSTRACT

Foamed aluminum bodies are coated with a polyvinyl chloride composition, the composition being a mixture of polyvinyl chloride made by a suspension process and that made by an emulsion process. Pigments, stabilisers and plasticizers may be added.

8 Claims, No Drawings

COATED FOAMED ALUMINUM BODY

BACKGROUND OF THE INVENTION

This invention relates to foamed aluminum. In particular, the invention relates to covering foamed aluminum surfaces. More particularly, the invention relates to covering foamed aluminum by coating the surfaces with polymer compositions.

Foamed metals are well known in the prior art (see U.S. Pat. Nos. 2,895,819, 3,300,296, and 3,297,431). In general, such foams are prepared by adding a gas-evolving compound to a molten metal, and heating the resultant mixture to decompose the gas-forming compound to prepare blowing gas. The gas causes the metal to foam by expansion. After blowing, the resultant body is cooled to produce a foamed solid. Such gas-forming solid may be a metal hydride such as $TiH_2$, $ZrH_2$, or magnesium, aluminum, or lithium hydride (see U.S. Pat. No. 2,983,597).

Foamed aluminum has a number of surface deficiencies. The surface is irregular, microporous, abrasive, susceptible to corrosion and weathering, and is generally unattractive. One of the surfaces of foamed aluminum bodies, hereinafter referred to as the skin surface, is relatively smooth, although there are still present thereon small pits and irregularities. It is therefore highly desirable that the surface of foamed aluminum be covered in some manner to prevent weathering of the surface, to make the surface smooth and regular, and, in general, to improve the appearance of the surface.

It is thus an object of the present invention to provide a surface coating for foamed aluminum.

It is another object of the present invention to provide a surface coating for foamed aluminum which will cover all surface deficiencies.

Co-pending application Ser. No. 774,756, filed Nov. 12, 1968, (assigned to the assignee of the present application) discloses certain organopolymeric coatings for foamed aluminum. The co-pending application discloses coatings of plastic materials which when applied to the foamed aluminum surface, act as adhesives for attaching other objects to the surface of the foamed aluminum, and improve the appearance of the foamed aluminum.

THE INVENTION

It has been discovered that surface deficiencies of foamed aluminum may be covered by coating the aluminum surfaces with polymer compositions of polyvinyl chloride. The polymer composition contains two types of polyvinyl chloride particles, the first type being produced by a suspension process, and the second type being produced by an emulsion process.

Foamed aluminum having surfaces treated with polymer compositions prepared in accordance with the present invention has many advantages over untreated foamed aluminum. The coated surfaces are hard, smooth, and attractive in appearance. The coatings may have pigments incorporated therein to impart an attractive color to the coating. The foamed aluminum surfaces may be treated in a one-step process to yield a surface which is attractive in appearance and which needs no further finishing.

Foamed aluminum coated with compositions prepared in accordance with the present invention may be used for walls, floors, and ceilings in the building construction industry. Foamed aluminum coated with compositions prepared in accordance with the present invention are particularly suitable in the mobile home construction industry, since the foamed aluminum is light in weight. Foamed aluminum coated in accordance with the present invention is particularly suited in constructing walls which require no further interior or exterior finishing. Such coated foamed aluminums are also exceptionally well suited for construction of boat and ship hulls, decks, and cabins, because foamed aluminum is light in weight, and the surface coatings prepared in accordance with the present invention make the aluminum extremely resistant to seawater corrosion.

Of the many types of polymers which may be used in coating compositions, polyvinyl chloride has been found to be excellent for coating foamed aluminum. Polyvinyl chloride compositions prepared in accordance with the present invention have been found to yield a tough, chip resistant, and corrosion resistant surface, which is also aesthetically attractive.

The particle size of the polyvinyl chloride resin used is important in determining suitability of the resin for use as a coating for foamed aluminum. The method by which the polymer of polyvinyl chloride is produced has also been found to be important. In particular, it has been discovered that superior coatings are produced when a polymer of polyvinyl chloride made by a suspension process is combined with a polymer of polyvinyl chloride made by an emulsion process provided that the average particle size of the polyvinyl chloride produced by the suspension process is relatively large after absorption of a plasticizer as compared to the average particle size of the polyvinyl chloride produced by the emulsion process. Polyvinyl chloride produced by a suspension process, hereinafter referred to as suspension polyvinyl chloride, is essential because only suspension polyvinyl chloride will absorb a plasticizer and swell to a larger particle size. Polyvinyl chloride produced by an emulsion process, hereinafter referred to as emulsion polyvinyl chloride, is essential because the small particle size relative to that of the suspension polymer allows the emulsion polymer to collect or gather in the voids or spaces between the swollen particles of the suspension polymer, and does not swell substantially upon contact with a plasticizer.

By collecting in the voids between the swollen suspension polymer particles, the emulsion polymer acts as a lubricant for the larger suspension polymer particles, thereby improving the ability of the mixture to flow and thus enabling the mixture to be more easily electrostatically sprayed onto the surface of the foamed aluminum. Build-up of the composition on the surface of the electrostatic spray gun is also reduced. In addition, the smoothness of the sprayed surface is greatly improved.

The particular suspension or emulsion processes used to prepare the suspension or emulsion polymers is not critical in preparing a composition in accordance with the present invention. Among the many processes that may be used for preparing a suspension polymer suitable for use in preparing a composition in accordance with the present invention are those disclosed in the following U.S. Pat. Nos. 2,511,592; 2,194,354; 2,476,474; 2,470,911; 2,580,277; 2,543,094; 2,564,291; 2,564,292; 2,594,375; 2,524,627; 2,511,811; and 2,528,469. Among the many processes that may be used for preparing an emulsion polymer suitable for use in preparing a composition in accordance with the present invention are those disclosed in the following U.S. Pat. Nos. 2,068,424; 2,168,808; 2,404,791; 2,366,306; 2,419,347; 2,259,180; 2,475,016; 2,356,925; and 2,520,959.

Polymer composition prepared in accordance with the present invention include a polyvinyl chloride resin produced by the suspension process, a polyvinyl chloride resin produced by an emulsion process, a plasticizer, a stabilizer, and a pigment.

Many liquid plasticizers may be used in preparing the polymer composition. Typical of the plasticizers which may be used are: dimethyl phthalate, diethyl phthalate, dimethoxyethyl phthalate, dibutyl phthalate, butyl cyclohexyl phthalate, butyl benzyl phthalate, dibutoxy ethyl phthalate, di-2-ethylbutyl phthalate, bis(diethylene glycol monoethyl ether) phthalate, di-n-hexyl phthalate, di-2-ethylhexyl phthalate, diisooctyl phthalate, di-2-ethylhexyl hexahydrophthalate, tri-n-butyl phosphate, tributoxyethyl phosphate, cresyl diphenyl phosphate, 2-ethylhexyl diphenyl phosphate, tricresyl phosphate, di-n-hexyl adipate, di-butyl-2-ethoxyethyl adipate, di-2-ethylhexyl adipate, diiso-octyl adipate, octyl decyl adipate, butyl phthallyl butyl glycolate, ethyl phthallyl ethyl glycolate, di-n-butyl sebacate, di-2-ethylhexyl sebacate, di-2-ethylhexyl azelate, methoxyethyl acetyl ricinoleate, polyglycol di-2-ethylhexanoate polyesters of dibasic acids and diols (k- nown as different grades of Paraplex and manufactured by Rohm and Haas Co.), chlorinated paraffin, epoxidized soya oil, tetra-n-butyl thio disuccinate, bis(dimethyl benzyl) ether. A particularly preferred plasticizer is di-2-ethylhexyl phthalate.

Those skilled in the art will recognize that in commercial usage polyvinyl chloride resins are blended with various ingredients to enhance their suitability for particular applications. Heat stabilizers, light stabilizers, antifungal agents, fillers and pigments have all been incorporated in polyvinyl chloride resins, and the resins of the present invention may also contain these ingredients. The use of such materials, however, is not a critical feature of the present invention. Discussions of the use of such additives are available in the technical literature, for example, in the Modern Plastics Encyclopedia, issue for 1959, published in September 1958, by Plastics Catalog Corporation, Bristol, Connecticut. A preferred stabilizer is polymeric dialkyltin-thioglycolate,

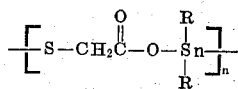

where $n$ is an integer and R is an alkyl. R is preferably a butyl group. A suitable commercial dialkyltin-thioglycolate is Advastab T-360 made by Advance Division, Carlysle Chemical Works, Inc.

Any common pigment may be used, depending upon the color desired to coat the surface. Among the many pigments which are suitable for the present invention are barium sulfate, antimony oxide, calcium carbonate, and the like. Particularly preferred is titanium dioxide.

The suspension polyvinyl chloride used in preparing the polymer composition may have a suitable particle size distribution, as follows: 100 percent smaller than 60 mesh, 90-100 percent smaller than 80 mesh, 80-90 percent smaller than 100 mesh, 75-80 percent smaller than 140 mesh, and 30-40 percent smaller than 325 mesh (all mesh measurements are standard U.S. mesh). A preferred particle size distribution for the suspension polyvinyl chloride is as follows: 100 percent smaller than 80 mesh, 95 percent smaller than 100 mesh, 80 percent smaller than 140 mesh, and 40 percent smaller than 200 mesh.

The emulsion polyvinyl chloride powder used in preparing the polymer composition may have a suitable particle size distribution of 100 percent smaller than 60 mesh, 85-90 percent smaller than 80 mesh, 75-85 percent smaller than 100 mesh, 65-75 percent smaller than 140 mesh, 55-75 percent smaller than 200 mesh, 50-55 percent smaller than 325 mesh. A preferred particle size distribution for the emulsion polyvinyl chloride is as follows: 100 percent smaller than 60 mesh, 90 percent smaller than 80 mesh, 83 percent smaller than 100 mesh, 73% smaller than 140 mesh, 67 percent smaller than 200 mesh, and 55 percent smaller than 325 mesh.

It is important to mix the components of the polymer composition in certain proportions. The following suitable proportions are given in parts per hundred parts of suspension polyvinyl chloride:

The polyvinyl chloride powder produced by the emulsion process may suitably comprise from about 10 to about 100 parts per hundred part of suspension polymer. A particularly preferred range is from about 25 to about 50 parts per hundred part of suspension polymer.

The plasticizer may suitably range from about 15 to about 60 parts per hundred part of suspension polymer. A particularly preferred range of the plasticizer is from about 25 to about 60 parts per hundred part of suspension polymer.

The stabilizer may suitably range from about 2 to about 8 parts per hundred parts of suspension polymer. A particularly preferred range for the stabilizer is from about 4 to about 6 parts per hundred part of suspension polymer.

In addition, a lubricant in the amount of about 1-2 parts per hundred is desirable. Suitable lubricants include N,N'-distearylethylene diamine, sold commercially as Advawax 280 (Advance Division, Carlysle Chemical Works, Inc.), glycerol monostearate and sodium stearate. Particularly preferred is calcium stearate.

The following alloys yield foams suitable for this invention when used in a process employing a titanium or zirconium hydride as a blowing agent. Suitable techniques are the processes of the prior art set forth in the patents cited herein in the section "Background of the Invention." Moreover, said alloys yield suitable foams when the molten alloy is made more viscous by a suitable viscosity-increasing agent.

| | |
|---|---|
| Alcoa alloy 7075 | (1.6% Cu, 2.5% Mg, 0.3% Cr, 5.6% Zn, remainder Al) |
| Alcoa alloy 2024 | (4.5% Cu, 0.6% Mn, 1.5% Mg, remainder Al) |
| 5086 | (0.45% Mn, 4.0% Mg, 0.1% Cr, remainder Al) |
| 6063 | (0.4% Si, 0.7% Mg, remainder Al) |
| Almag 35 | (6-8% Mg, in Al) |
| 1000 series Al | (99.6% minimum Al) |
| 2011 | (5.5% Cu, 0.5% Pb, 0.5% Bi, remainder Al) |
| 2218 | (4.0% Cu, 1.5% Mg, 2% Ni, remainder Al) |
| 3005 | (1.2% Mn, 0.4% Mg, remainder Al) |
| 4032 | (12.2% Si, 0.9% Cu, 1.1% Mg, 0.9% Ni, remainder Al) |
| 4043 | (5% Si, 95% Al) |
| 8280 | (1.5% Si, 1.0% Cu, 0.5% Ni, remainder Al) |
| Magnalium | 70% Al, 30% Mg |

The following examples are illustrative of the preparation of compositions for coating foamed aluminum in accordance with the present invention. In each of the examples, a sample of foamed aluminum having a density of 10 to 40 percent of the density of aluminum ingot was employed. The sample had approximate dimensions of 5 inches × 15 inches × 1 inch, a pore size average of one-sixteenth to three thirty-seconds of an inch, and a pore size distribution of approximately 80 percent between about one-eighth of an inch to about one sixty-fourth of an inch.

EXAMPLE I

100 Parts of the suspension polyvinyl chloride resin having a particle size distribution of 100 percent smaller than 60 mesh, 99.5 percent smaller than 80 mesh, 94.5 percent smaller than 100 mesh, 80.0 percent smaller than 140 mesh, 38.5 percent smaller than 200 mesh, was added to a Henschel Mixer and agitation was begun. 29 Parts of di-2-ethylhexyl phthalate plasticizer was added over a 5 minute period at a continuous rate. Temperature was maintained at 70° C. and mixing was continuous. A solution of 29 parts of di-2-ethylhexyl phthalate and 6 parts of a stabilizer consisting of a polymeric dialkyltin-thioglycolate (Advance Division, Carlysle Chemical Works, Inc. Advastab T-360) was added to the mixture of suspension polymer and plasticizer and the total mass was agitated and mixed for 10 minutes at a temperature of 90° C. 50 parts of an emulsion polyvinyl chloride resin having a particle size distribution of 100 percent smaller than 60 mesh, 87.2 percent smaller than 80 mesh, 82.8 percent smaller than 100 mesh, 73.2 percent smaller than 140 mesh, 66.4 percent smaller than 200 mesh, and 54.4 percent smaller than 325 mesh, was added to the mixture. The mixture was agitated for about 3 minutes. The mixture was cooled to 35° C. and 1.5 parts of calcium stearate was added in addition to 1.5 parts of TiO$_2$. The mixture was stirred for 20 minutes. The resulting powder was electrostatically sprayed onto the skin surface of the foamed aluminum body. The foamed aluminum body was then placed in an oven heated to 450° F. and allowed to dry for 3 minutes. Upon removal from the oven the foamed aluminum surface was found to have a hard, smooth, red coating thereon. All defects of the skin surface were hidden. The coated surface was hard and lustrous.

EXAMPLE II

A composition is prepared as in Example I with the exception that only 15 parts of emulsion polyvinyl chloride powder is employed. Upon electrostatically spraying the skin surface of the foamed aluminum body and heating in an oven as in Example I, the foamed aluminum sample was found to have a hard, red, smooth coating thereon. All defects of the skin surface were hidden.

EXAMPLE III

A composition is prepared as in Example I with the exception that 50 parts of emulsion polyvinyl chloride powder per 100 parts of suspension polyvinyl chloride powder is employed. Upon electrostatically spraying and baking a foamed aluminum body as in Example I the foamed aluminum sample was found to have a hard, smooth, red coating thereon. All defects of the skin surface were hidden.

EXAMPLE IV

100 Parts of a suspension polyvinyl chloride resin having a particle size distribution of 100 percent smaller than 60 mesh, 90 percent smaller than 80 mesh, 86 percent smaller than 100 mesh, 75 percent smaller than 140 mesh, and 40 percent smaller than 200 mesh, is added to a Henschel Mixer and agitation begun. 20 Parts of di-2-ethylhexyl phthalate is added over a 5 minute period at a continuous rate. Temperature is maintained at 85° C. and mixing is continuous. A solution of 20 parts of di-2-ethylhexyl phthalate and 4 parts of a dialkyltin thioglycolate polymer (Advance Division, Carlysle Chemical Works, Inc., Advastab T–360) is added to the mixture of suspension polymer and plasticizer, and the total mass is agitated for 10 minutes. 75 Parts of emulsion polyvinyl chloride resin having a particle size distribution of 100 percent smaller than 60 mesh, 88 percent smaller than 80 mesh, 83 percent smaller than 100 mesh, 74 percent smaller than 140 mesh, 67 percent smaller than 200 mesh, and 55 percent smaller than 325 mesh, is added to the mixture. The mixture is then agitated for about 10 minutes. The mixture is cooled to 38° C. 1 Part of calcium stearate and 1 part of titanium dioxide is added to the mixture and the mixture was stirred for 20 minutes. The resulting powder is electrostatically sprayed onto the skin surface of the foamed aluminum body. The foamed aluminum body is then placed in an oven heated to 470° F. and allowed to dry for 3 minutes. Upon removal from the oven, the foamed aluminum sample is found to have a hard, smooth, red coating on the skin surface thereof. All defects and irregularities of the skin surface were hidden.

EXAMPLE V

Example IV is repeated with the exception that only 50 parts of emulsion polyvinyl chloride is employed.

EXAMPLE VI

Example IV is repeated with the exception that only 25 parts of emulsion polyvinyl chloride and only 3 parts of Advastab T–360 stabilizer are used.

EXAMPLE VII

Example IV is repeated with the exception that the suspension polyvinyl chloride has a particle size distribution of 100 percent smaller than 60 mesh, 89 percent smaller than 80 mesh, 85 percent smaller than 100 mesh, 80 percent smaller than 140 mesh, and 40 percent smaller than 200 mesh.

EXAMPLE VIII

100 Parts of a suspension polyvinyl chloride resin having a particle size distribution of 100 percent smaller than 60 mesh, 90 percent smaller than 80 mesh, 80 percent smaller than 100 mesh, 75 percent smaller than 140 mesh, and 40 percent smaller than 200 mesh, is added to a Henschel Mixer and agitation is begun. 25 Parts of diiso-octyl phthalate was added over a 5 minute period at a continuous rate. Temperature of the mixture was maintained at 75° C. A solution of 25 parts of diiso-octyl phthalate and 5 parts of dialkyltin thioglycolate (Advance Division, Carlysle Chemical Works, Inc., Advastab T–360) is added to the mixture of suspension polymer and plasticizer and the total mass is agitated and mixed for 10 minutes at a temperature of 110° C. Agitation is continued and the temperature decreased to 65° C., at which point 25 parts of an emulsion polyvinyl chloride polymer having a particle size distribution of 100 percent smaller than 60 mesh, 85 percent smaller than 80 mesh, 75 percent smaller than 100 mesh, 65 percent smaller than 140 mesh, 55 percent smaller than 200 mesh, and 50 percent smaller than 325 mesh, is added to the mixture. The mixture is agitated for about 10 minutes and cooled to 35° C. 2 Parts of calcium stearate and 2 parts of antimony oxide are added and the mixture is stirred for 20 minutes. The resulting powder is electrostatically sprayed onto the skin surface of the foamed aluminum body. The foamed aluminum body is then placed in an oven heated to 440° F. and allowed to dry for 4 minutes. Upon removal from the oven the foamed aluminum sample is found to have a hard, smooth coating on the skin surface thereof. All defects of the skin surface are hidden. The coated surface is very hard and lustrous.

EXAMPLE IX

Example VIII is repeated with the exception that 50 parts of emulsion polyvinyl chloride are employed.

EXAMPLE X

Example IX is repeated with the exception that 15 parts of emulsion polymer are employed.

EXAMPLE XI

Example IX is repeated with the exception that only 15 total parts of plasticizer are employed.

What is claimed is:

1. A foamed aluminum body having a polymer composition coating thereon, said polymer composition coating comprising a polyvinyl chloride resin, a plasticizer, and a stabilizer, said polyvinyl chloride resin consisting essentially of a polyvinyl chloride resin produced by a suspension process and a polyvinyl chloride resin produced by an emulsion process.

2. The foamed aluminum body of claim 1, wherein said polymer composition coating is electrostatically placed thereon.

3. The foamed aluminum body of claim 1 wherein said polyvinyl chloride resin produced by said suspension process has a particle size distribution of 100 percent smaller than 60 mesh, 99 percent smaller than 80 mesh, 95 percent smaller than 100 mesh, 80 percent smaller than 140 mesh, and 39 percent smaller than 200 mesh.

4. The foamed aluminum body of claim 1 wherein said polyvinyl chloride resin produced by said emulsion process has a particle size distribution of 100 percent smaller than 60 mesh, 88 percent smaller than 80 mesh, 83 percent smaller than 100 mesh, 74 percent smaller than 140 mesh, 67 percent smaller than 200 mesh, and 54 percent smaller than 325 mesh.

5. The foamed aluminum body of claim 1 wherein said plasticizer consists of di-2-ethylhexyl phthalate.

6. The foamed aluminum body of claim 1 wherein said polyvinyl chloride composition includes a pigment.

7. The foamed aluminum body of claim 1 wherein said foamed aluminum body is an alloy having 6–8 percent magnesium.

8. The foamed aluminum body of claim 1 wherein said foamed aluminum body has an average pore size of from about one thirty-second to about three thirty-seconds of an inch.

* * * * *